United States Patent
Tsai

(10) Patent No.: US 11,346,402 B2
(45) Date of Patent: May 31, 2022

(54) UNIVERSAL SOCKET STRUCTURE

(71) Applicant: Jhih Sheng Tsai, Taichung (TW)

(72) Inventor: Jhih Sheng Tsai, Taichung (TW)

(*) Notice: Subject to any disclaimer, the term of this patent is extended or adjusted under 35 U.S.C. 154(b) by 399 days.

(21) Appl. No.: 16/422,132

(22) Filed: May 24, 2019

(65) Prior Publication Data

US 2020/0248740 A1 Aug. 6, 2020

(30) Foreign Application Priority Data

Feb. 1, 2019 (TW) .................................. 108201746

(51) Int. Cl.
*F16D 3/205* (2006.01)
*F16C 11/06* (2006.01)
*B25B 23/00* (2006.01)

(52) U.S. Cl.
CPC ........ *F16D 3/2052* (2013.01); *B25B 23/0014* (2013.01); *F16C 11/0623* (2013.01)

(58) Field of Classification Search
CPC ..... Y10T 403/32041; Y10T 403/32557; Y10T 403/32565; Y10T 403/32811; Y10T 403/32819; Y10T 403/32827; Y10T 403/587; Y10T 403/592; F16C 11/0609; F16C 11/0614; F16C 11/0623; F16C 11/0647; F16C 11/106; F16D 3/2052; F16D 3/26; F16D 3/44; Y10S 464/906; B25B 23/0014; B25B 23/0021; B25B 23/0028
USPC .............. 464/112, 120, 151, 906; 81/177.75, 81/177.85
See application file for complete search history.

(56) References Cited

U.S. PATENT DOCUMENTS

| 2,910,310 | A | * | 10/1959 | Mulac | F16C 11/0604 285/91 |
| 4,114,401 | A | * | 9/1978 | Van Hoose | F16D 3/2052 464/120 |
| 4,643,472 | A | * | 2/1987 | Schukei | F16B 2/16 294/94 |
| 4,936,701 | A | * | 6/1990 | Allen | B25B 13/06 403/114 |
| 6,152,826 | A | * | 11/2000 | Profeta | F16D 3/185 464/106 |

(Continued)

FOREIGN PATENT DOCUMENTS

TW I397456 B1 6/2013

*Primary Examiner* — Josh Skroupa
(74) *Attorney, Agent, or Firm* — Rosenberg, Klein & Lee

(57) ABSTRACT

A universal socket structure includes a female seat, a joint member, at least one engaging member, and an elastic member. A coupling end the female seat is recessed to form an accommodating trough. Two opposite sides of the accommodating trough are formed with grooves extending along an axial direction of the female seat. The female seat has at least one coupling portion. The joint member has one end formed with a spherical head. Two opposite sides of the spherical head has protrusions protruding from an outer periphery of the spherical head. The spherical head is accommodated in the accommodating trough. The protrusions are accommodated in the grooves. The engaging member is disposed in the coupling portion and movable from the coupling portion toward the accommodating trough. The elastic member is disposed in the accommodating trough for pushing and supporting the spherical head to engage with the engaging member.

12 Claims, 6 Drawing Sheets

(56) References Cited

U.S. PATENT DOCUMENTS

| | | | | |
|---|---|---|---|---|
| 7,117,769 B2* | 10/2006 | Somers | B25B 13/06 |
| | | | 81/177.75 |
| 7,481,136 B2* | 1/2009 | Chiang | B25B 13/102 |
| | | | 81/177.75 |
| 7,673,911 B2* | 3/2010 | Liu | F16L 37/23 |
| | | | 285/316 |
| 8,001,873 B2* | 8/2011 | Peng | B25B 23/0028 |
| | | | 81/177.75 |
| 8,192,103 B2* | 6/2012 | Tsai | F16D 3/2052 |
| | | | 403/72 |
| 8,246,476 B2* | 8/2012 | Chen | B25B 13/481 |
| | | | 464/141 |
| 8,366,339 B2* | 2/2013 | Lin | F16C 11/0604 |
| | | | 403/57 |
| 8,403,763 B2* | 3/2013 | Hu | F16D 3/16 |
| | | | 464/112 |
| 9,249,821 B2* | 2/2016 | Halder | F16B 35/005 |
| 11,041,523 B2* | 6/2021 | Chen | F16C 11/0604 |
| 2011/0179915 A1* | 7/2011 | Peng | B25F 3/00 |
| | | | 81/177.75 |
| 2012/0321374 A1* | 12/2012 | Ray | B25B 23/0035 |
| | | | 403/111 |
| 2019/0293112 A1* | 9/2019 | Tsai | F16C 11/0647 |

\* cited by examiner

UNIVERSAL SOCKET STRUCTURE

FIELD OF THE INVENTION

The present invention relates to a drive socket, and more particularly to a universal socket structure for connecting a hand tool or a pneumatic/electric tool.

BACKGROUND OF THE INVENTION

Universal sockets are attached to hand tools or pneumatic/electric tools for locking or unlocking bolts. As shown in FIG. 6, a universal socket structure disclosed in Taiwan Patent No. 1397456 includes a joint member 91. One end of the joint member 91 is formed with a spherical head 92. A pin 93 is inserted through a perforation 921 of the spherical head 92, and two ends of the pin 93 extend out of the outer circumference of the spherical head 92. When the spherical head 92 of the joint member 91 is accommodated in an accommodating trough 95 of a female seat 94, the two ends of the pin 93 are engaged in two longitudinal grooves 951 of the accommodating trough 95. The joint member 91 can be obliquely rotated relative to the female seat 94 to change its connection angle.

In the above patent, the joint member 91 consisting of the pin 93 passing through the perforation 921 of the spherical head 92 is widely used in existing universal socket structures. However, the conventional universal socket structures have the following problems:

1. For the joint member 91 consisting of the pin 93 passing through the perforation 921 of the spherical head 92, because the pin 93 and the spherical head 92 are two independent components, they must be manufactured separately, and their mating precision is controlled separately. In the assembly, the assembly step of inserting the pin 93 in the perforation 921 of the spherical head 92 must be performed first. On the premise that labor costs are increasing, many manufacturing and assembly steps will inevitably lead to an increase in manufacturing and assembly costs, which is not beneficial for the competition of products.

2. For the joint member 91 consisting of the pin 93 passing through the perforation 921 of the spherical head 92, because the pin 93 and the spherical head 92 are two independent components, when in use, the pin 93 and the perforation 921 of the spherical head 92 are easily worn and broken. Once the pin 93 and the perforation 921 of the spherical head 92 are worn and broken, the parts may be loose in use, and they may be thrown out during high-speed rotation.

SUMMARY OF THE INVENTION

The primary object of the present invention is to provide a universal socket structure, which can simplify the assembly step to reduce the manufacturing time and cost, and can solve the problem that in the conventional structure in which the pin is inserted into the perforation of the spherical head, the pin and the perforation of the spherical head are easily worn and broken after using a period of time.

Another object of the present invention is to provide a universal socket structure, which can simplify the edge trimming of a protrusion after the forging process and make it easier to manufacture.

Another object of the present invention is to provide a universal socket structure, which can enlarge the rotating angle of a joint member effectively so that the joint member can be rotated smoothly.

In order to achieve the above objects, the present invention provides a universal socket structure, comprising a female seat, a joint member, at least one engaging member, and an elastic member. The female seat is hollow. One end of the female seat is defined as a coupling end. Another end of the female seat is defined as a receiving end. The coupling end is recessed to form an accommodating trough. Two opposite sides of the accommodating trough are formed with a pair of grooves extending along an axial direction of the female seat. The female seat is formed with at least one coupling portion. The joint member has one end formed with a spherical head. Two opposite sides of the spherical head are provided with a pair of protrusions protruding from an outer periphery of the spherical head. The spherical head of the joint member is accommodated in the accommodating trough of the female seat. The protrusions are accommodated in the grooves, respectively. The engaging member is disposed in the coupling portion of the female seat. The engaging member is movable from the coupling portion toward the accommodating trough for engaging the spherical head. The elastic member is disposed in the accommodating trough of the female seat for pushing and supporting the spherical head to engage with the engaging member.

Preferably, wherein the coupling portion is a through hole penetrating through a peripheral wall of the female seat. An annular buckle is fitted on the female seat. When the annular buckle is fitted on the female seat, the annular buckle pushes the engaging member to move laterally toward the accommodating trough so that the engaging member partially extends to the accommodating trough for holding the spherical head.

Preferably, each of the grooves is a U-shaped groove and has a bottom surface and two side surfaces connected to the bottom surface. An angle between each of the two side surfaces and the bottom surface is greater than 90 degrees so that each of the grooves is gradually enlarged inwardly.

Preferably, each of the grooves is a U-shaped groove and has a bottom surface and two side surfaces connected to the bottom surface. An angle between each of the two side surfaces and the bottom surface is less than 90 degrees so that each of the grooves is gradually enlarged outwardly.

DETAILED DESCRIPTION OF THE PREFERRED EMBODIMENTS

Embodiments of the present invention will now be described, by way of example only, with reference to the accompanying drawings.

Figure 1:
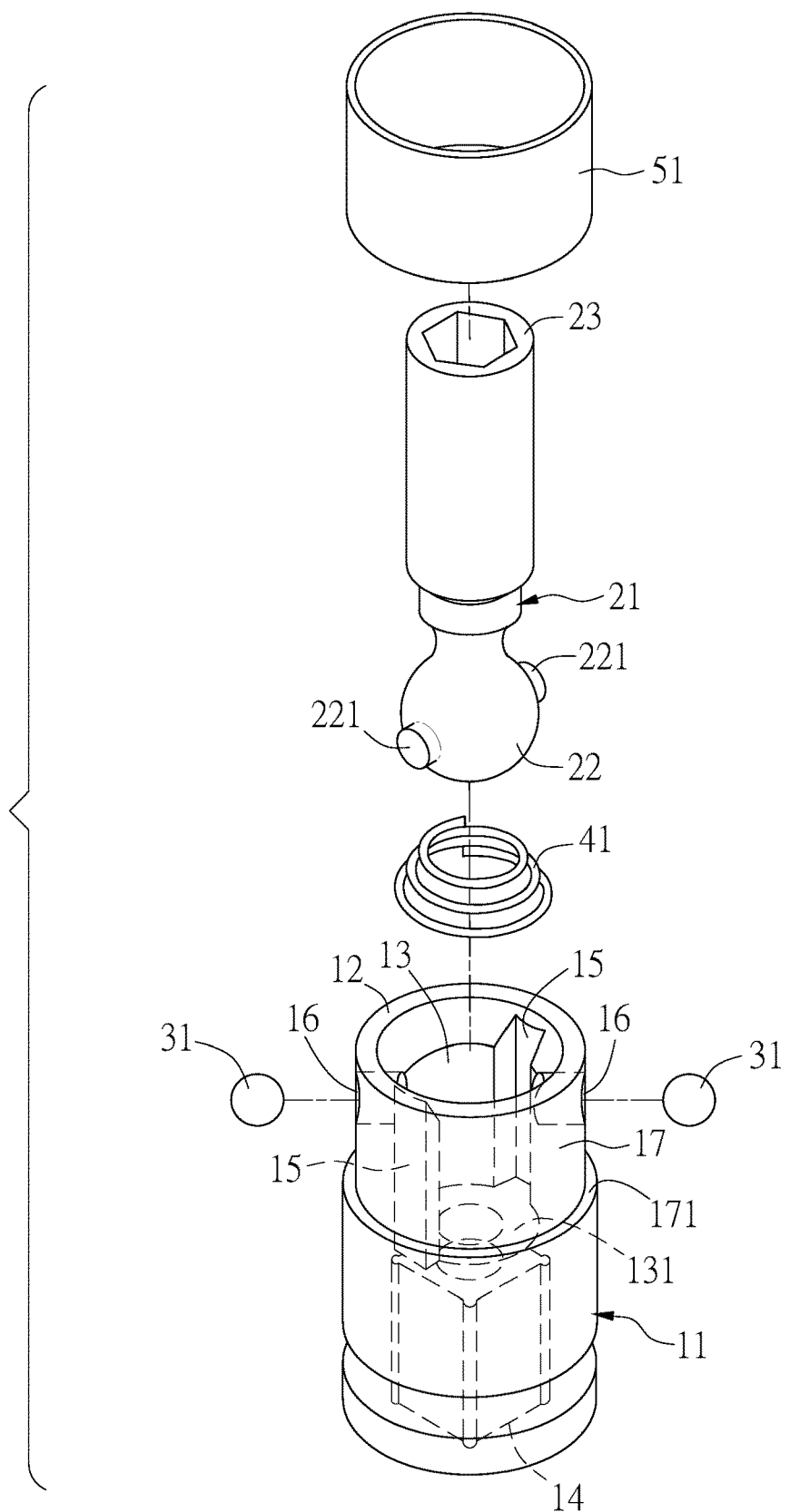
FIG. 1 is an exploded view in accordance with a first embodiment of the present invention.
Figure 2:
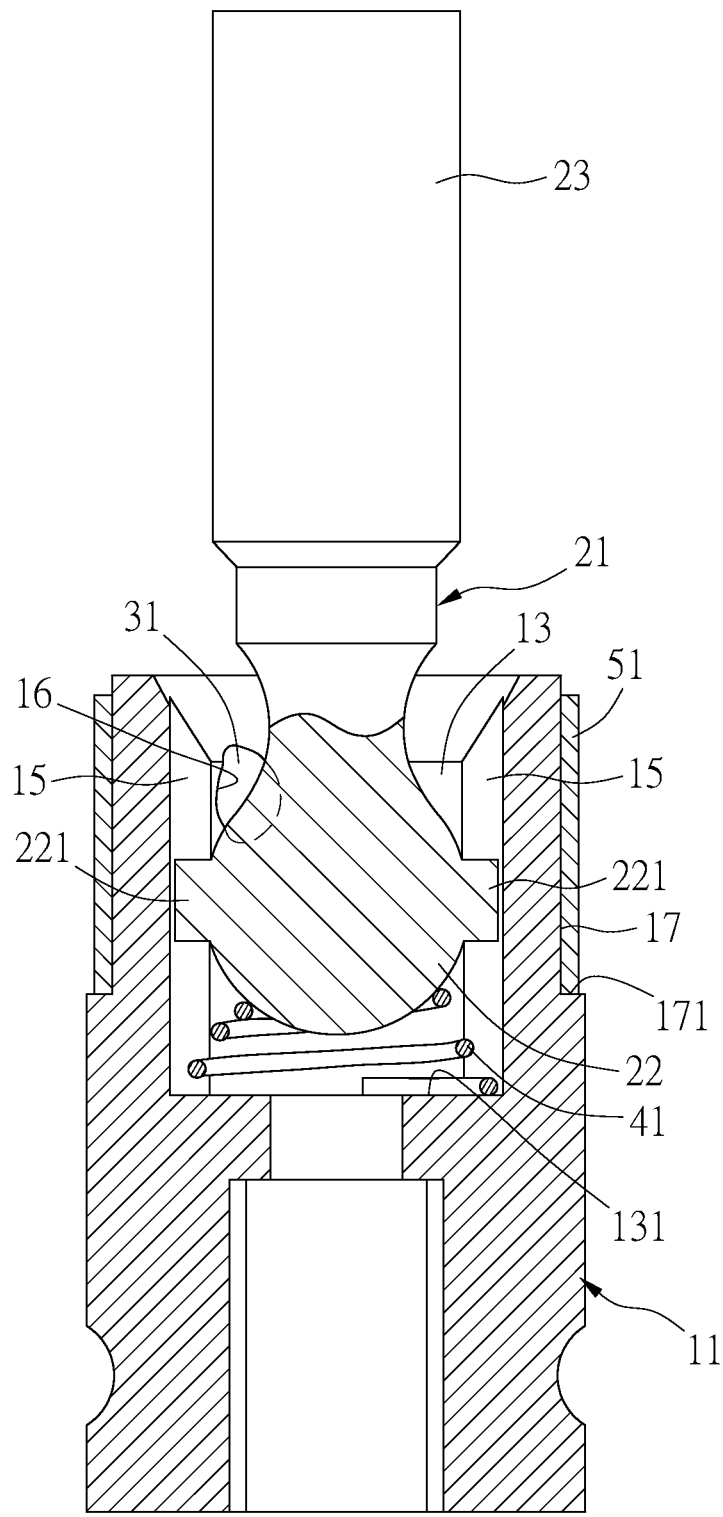
FIG. 2 is a lateral sectional view in accordance with the first embodiment of the present invention after assembled.
Figure 3:
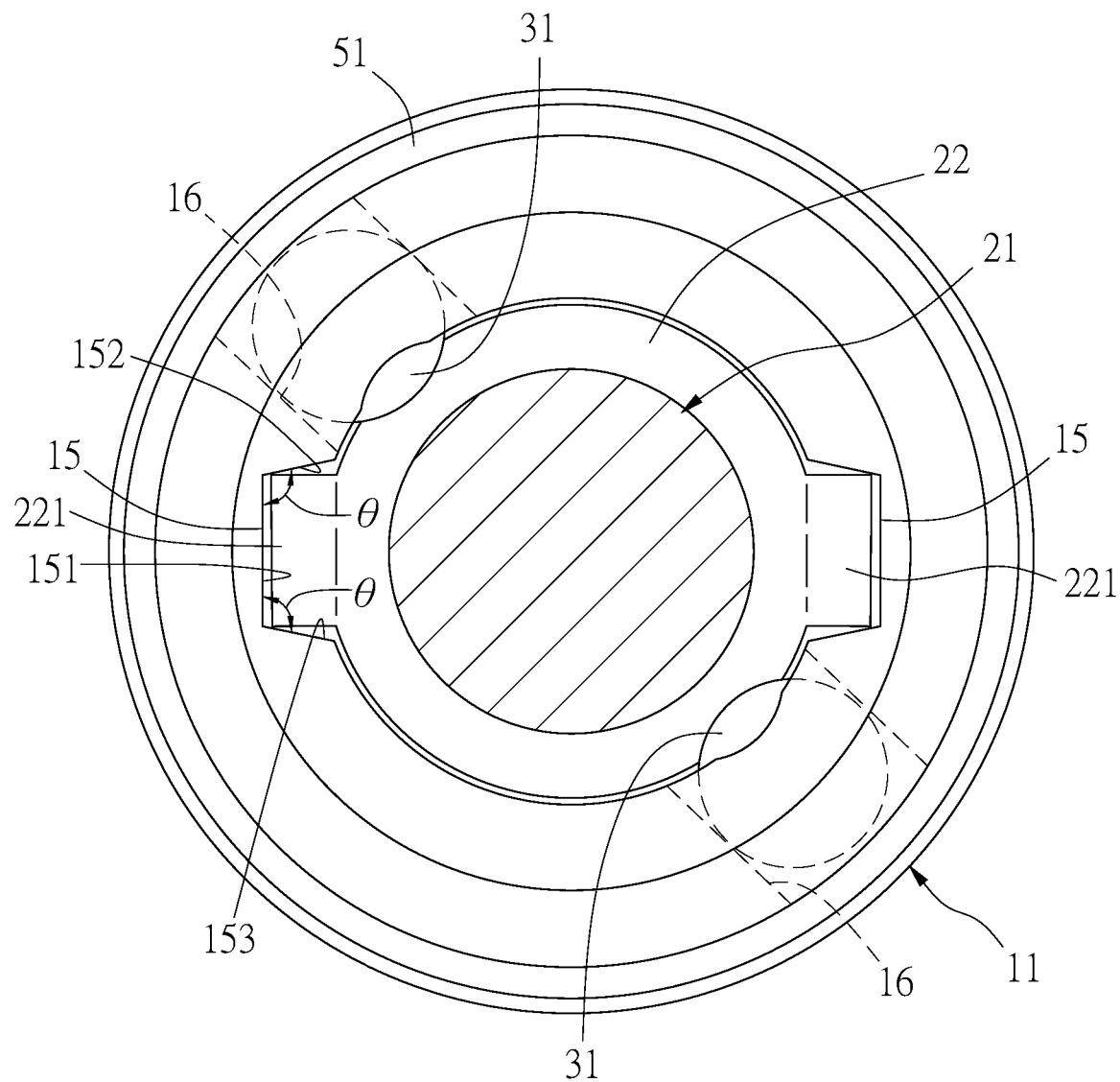
FIG. 3 is a cross-sectional view in accordance with the first embodiment of the present invention after assembled.

Referring to FIG. 1, FIG. 2 and FIG. 3, a universal socket structure in accordance with a first embodiment of the present invention comprises a female seat 11, a joint member 21, two engaging members 31, an elastic member 41, and an annular buckle 51.

Figure 4:
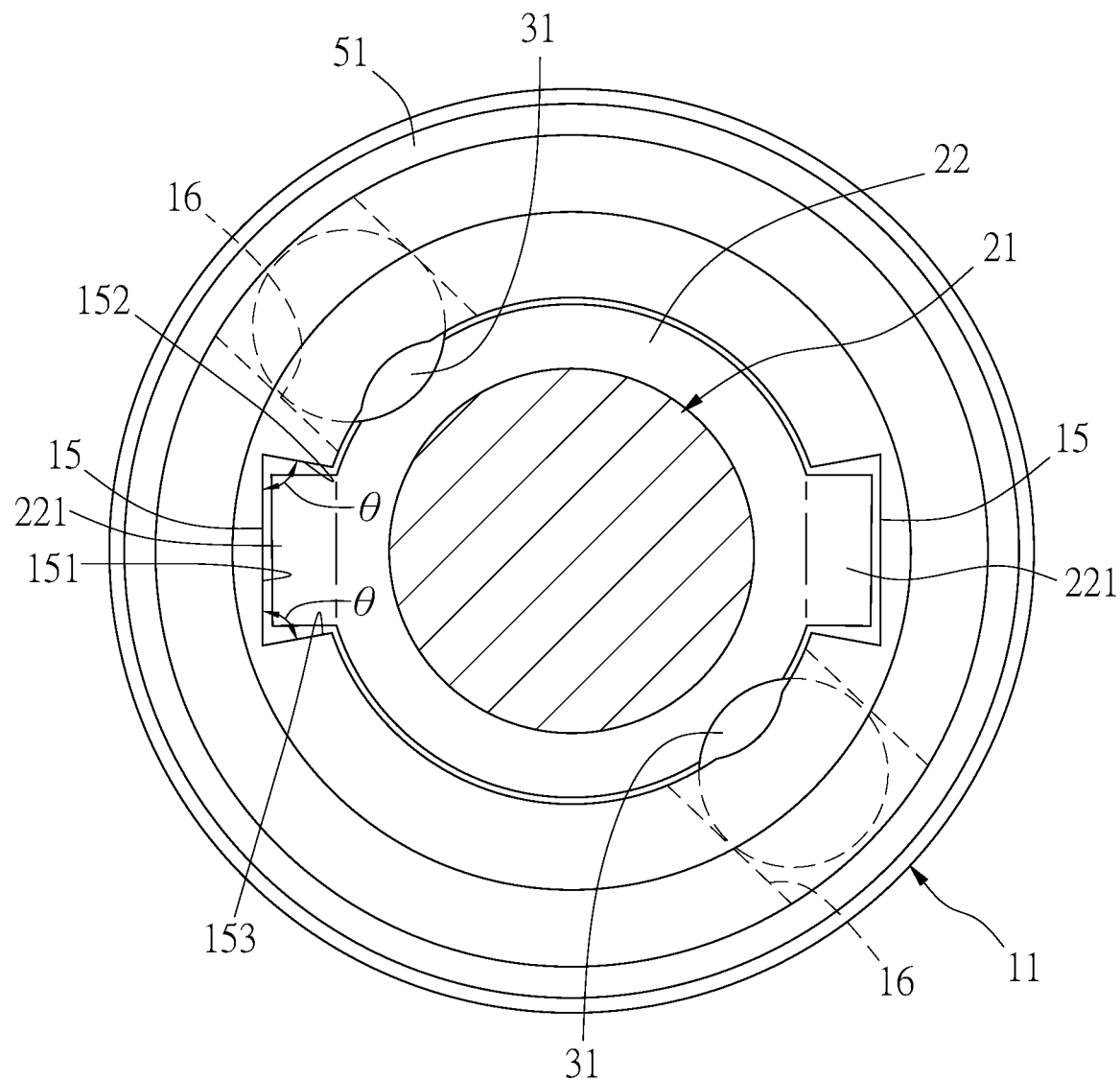
FIG. 4 is a cross-sectional view showing that the grooves of the female seat are gradually enlarged inwardly.

The female seat 11 has a cylindrical shape extending along an axial direction. One end of the female seat 11 is defined as a coupling end 12. The coupling end 12 is recessed to form an accommodating trough 13 in a cylindrical shape with an outward opening. Another end of the female seat 11 is defined as a receiving end 14. The receiving end 14 is recessed to form a square trough for receiving driving tools (not shown), such as hand tools or pneumatic/electric wrenches. Two opposite sides of the accommodating trough 13 are formed with a pair of grooves 15 extending along the axial direction of the female seat 11. The female seat 11 is formed with two coupling portions 16. The outer peripheral wall of the female seat 11 relative to the accommodating trough 13 is recessed to form an annular buckle recess 17. One end of the annular buckle recess 17, facing the receiving end 14, is formed with a limit shoulder 171. In this embodiment, the two coupling portions 16 are through holes penetrating through the peripheral wall of the female seat 11. The two coupling portions 16 are oppositely defined in the female seat 11 at a position different from the grooves 15 and communicate with the accommodating trough 13. Each of the grooves 15 is a U-shaped groove, and has a bottom surface 151 and two side surfaces 152, 153 connected to the bottom surface 151. An angle θ between each of the two side surfaces 152, 153 and the bottom surface 151 is not equal to 90 degrees. In this embodiment, an angle θ between each of the two side surfaces 152, 153 and the bottom surface 151 is greater than 90 degrees, so that each of the grooves 15 is gradually enlarged inwardly. The implementation of each groove 15 is not limited thereto. As shown in FIG. 4, each of the grooves 15 is a U-shaped groove, and has a bottom surface 151 and two side surfaces 152, 153 connected to the bottom surface 151. An angle θ between each of the two side surfaces 152, 153 and the bottom surface 151 is less than 90 degrees, so that each of the grooves 15 is gradually enlarged outwardly.

One end of the joint member 21 is enlarged outwardly to form a spherical head 22, and another end of the joint member 21 is formed with a connecting portion 23 for connecting a connecting tool, such as a socket (of course, the connecting portion 23 may be integrally formed into a socket directly). Two opposite sides of the spherical head 22 are provided with a pair of protrusions 221 protruding from the outer periphery of the spherical head 22. In this embodiment, the two protrusions 221 are integrally formed on the two opposite sides of the spherical head 22 by forging. The two protrusions 221 each have a cylindrical shape protruding from the outer periphery of the spherical head 22. The spherical head 22 of the joint member 21 is accommodated in the accommodating trough 13 of the female seat 11. The two protrusions 221 are accommodated in the grooves 15, respectively.

The two engaging members 31 are disposed in the coupling portions 16 of the female seat 11 and can be displaced from the coupling portions 16 toward the accommodating trough 13 for holding the spherical head 22 of the joint member 21 located in the accommodating trough 13. The engaging members 31 may be in the form of rods or balls. In this embodiment, the two coupling portions 16 are through holes penetrating through the peripheral wall of the female seat 11. The two engaging members 31 are balls, as an example, and are accommodated in the coupling portions 16 of the female seat 11, respectively. The outer diameter of the ball is greater than the thickness of the wall of the coupling portion 16, so that the two engaging members 31 partially extend to the accommodating trough 13 for holding the upper edge of the spherical head 22 of the joint member 21. The elastic member 41 may be a spring or an elastic sheet. One end of the elastic member 41 is elastically pressed against an abutting base 131 in the accommodating trough 13, and another end of the elastic member 41 is elastically pressed against the lower edge of the spherical head 22 of the joint member 21, thereby pushing and supporting the spherical head 22 of the joint member 21 to engage with the two engaging members 31. Of course, the coupling portion may be an annular groove recessed on the wall surface of the accommodating trough for engagement of the engaging member in the form of a snap ring.

The annular buckle 51 being hollow. The annular buckle 51 is fitted on the annular buckle recess 17 of the female seat 11 and abuts against the limit shoulder 171 to seal the two coupling portions 16. When the annular buckle 51 is fitted on the annular buckle recess 17, the inner circumferential surface of the annular buckle 51 pushes the two engaging members 31 to move laterally toward the accommodating trough 13, so that the two engaging members 31 partially extend to the accommodating trough 13 for holding the spherical head 22 effectively and reliably. The annular buckle 51 is fitted on the annular buckle recess 17 in a tight fit manner.

When the universal socket structure of the present invention is assembled, the two protrusions 221 are integrally formed with the spherical head 22 of the joint member 21, so there is no need to provide a pin for assembly. The protrusions 221 on the opposite sides of the spherical head 22 of the joint member 21 of the present invention are aligned with the two grooves 15 of the female seat 11, so that the spherical head 22 can be directly placed in the accommodating trough 13. Then, the engaging members 31 are placed in the coupling portions 16 of the female seat 11, and the annular buckle 51 is fitted on the annular buckle recess 17 of the female seat 11 and abuts against the limit shoulder 171. The annular buckle 51 pushes the two engaging members 31 to move laterally toward the accommodating trough 13, so that the two engaging members 31 are engaged with the upper edge of the spherical head 22. The elastic member 41 located at the bottom of the accommodating trough 13 provides a force for the spherical head 22 to be pushed upwardly, so that the spherical head 22 and the annular buckle 51 can push against the engaging members 31, thereby achieving an effective and reliable engagement, so as to prevent the joint member 21 from being loosened and to ensure that it won't be vibrated at a high speed.

In the present invention, the two protrusions 221 are integrally formed on the two opposite sides of the spherical head 22 of the joint member 21 by forging. Therefore, the assembly step can be simplified to reduce the manufacturing time and cost, and it can solve the problem that in the structure in which the pin is inserted in the perforation of the spherical head, the pin and the perforation of the spherical head are easily worn and broken after using a period of time. Furthermore, in the present invention, the two grooves 15 of the female seat 11 are gradually enlarged outwardly or inwardly, so that when the protrusions 221 of the spherical head 22 of the joint member 21 are correspondingly accommodated in the grooves 15, the rotating angle of the joint member 21 relative to the female seat 11 can be enlarged effectively, and the practicality is enhanced greatly.

Figure 5:
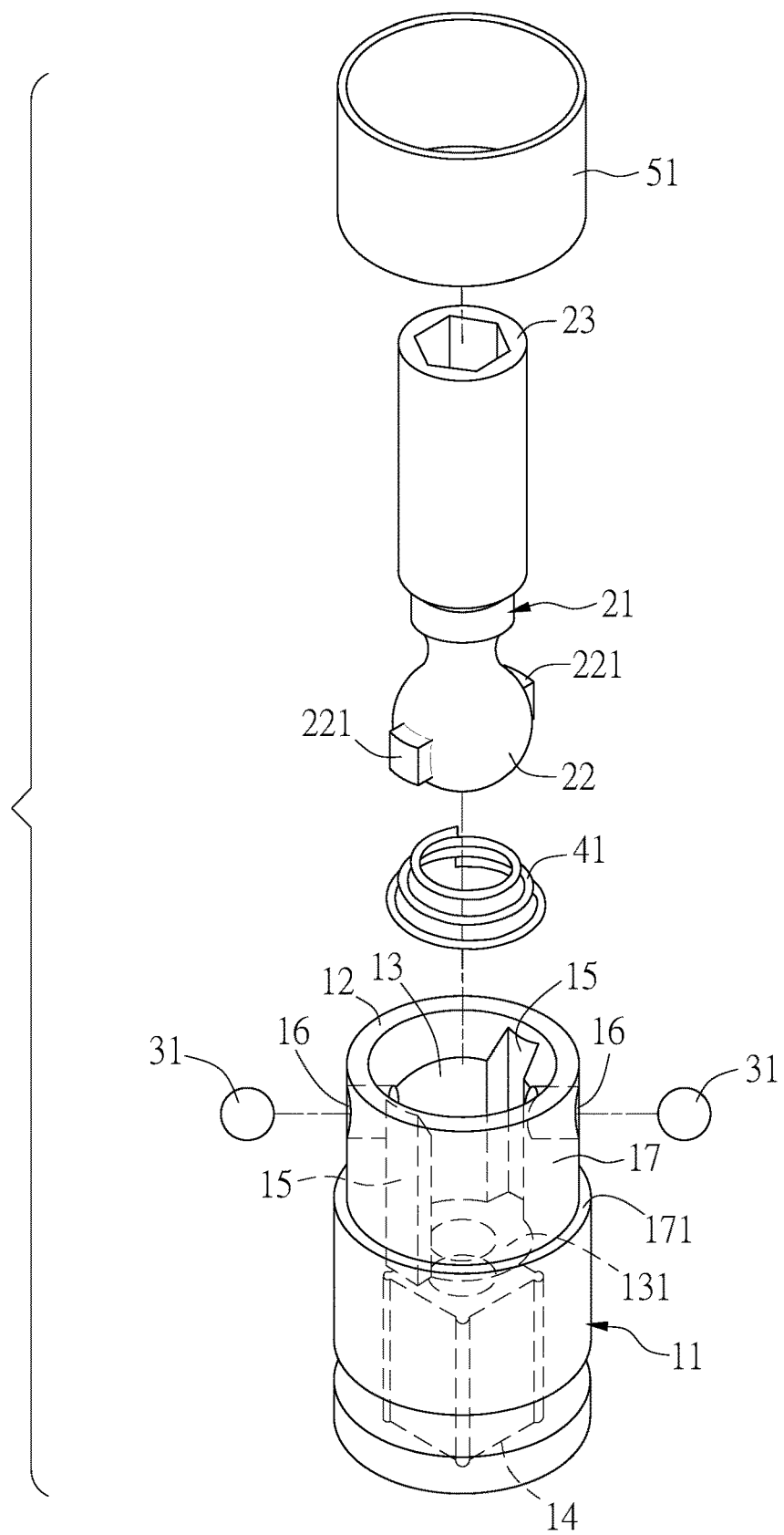
FIG. 5 is an exploded view in accordance with a second embodiment of the present invention.
Figure 6:
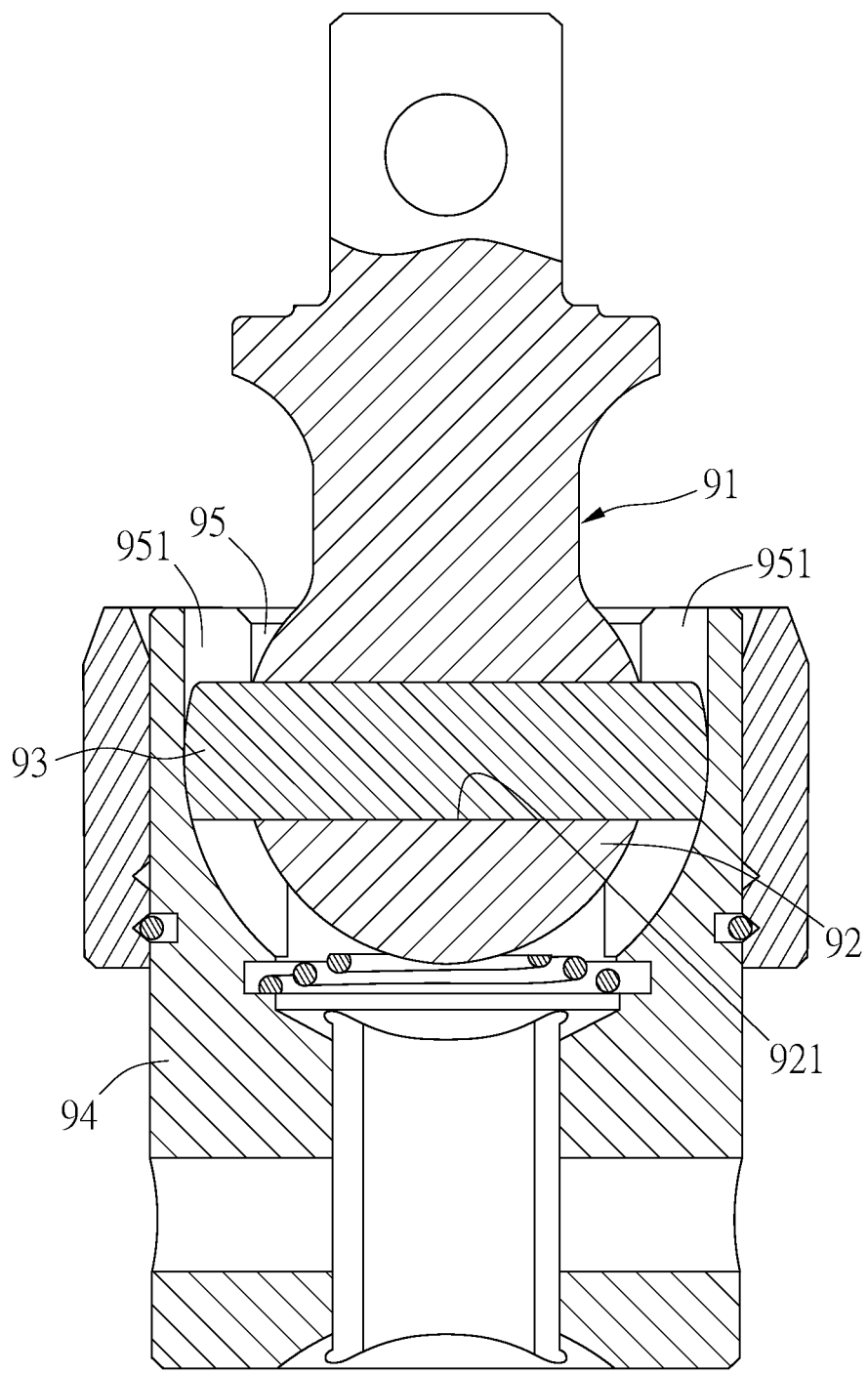
FIG. 6 is a schematic view showing a conventional universal socket disclosed in Taiwan Patent No. 1397456.

In addition, the universal socket structure of the present invention is not limited to the first embodiment disclosed above. FIG. 5 illustrates a second embodiment of the present invention, which is substantially similar to the first embodiment with the exceptions described hereinafter. The protrusions 221 of the spherical head 22 of the joint member 21 are integrally formed into a polygonal post by forging, such as a triangular post, a quadrangular post or a pentagonal post. In the second embodiment, a quadrangular post is taken as an example. The protrusions 221 are integrally formed with the outer periphery of the spherical head 22, so that the assembly step can be simplified to reduce the manufacturing time and cost, and it can solve the problem that in the structure in which the pin is inserted into the perforation of the spherical head, the pin and the perforation of the spherical head are easily worn and broken after using a period of time. Furthermore, the protrusions 221 are in the form of a polygonal post, which can simplify the edge trimming of the protrusions 221 after the forging process and make it easier to manufacture. Furthermore, the two grooves 15 of the female seat 11 are gradually enlarged outwardly or inwardly. When the joint member 21 having the polygonal protrusions 221 is rotated relative to the female seat 11, it can be rotated smoothly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A universal socket structure, comprising:
   a hollow female seat, one end of the female seat being a coupling end and another opposing end of the female seat being a receiving end, the coupling end being recessed to form an accommodating trough at a corresponding inner wall surface of the female seat, a section of an outer wall surface of the female seat adjacent to the coupling end is formed with an annular buckle recess, two opposite sides of the accommodating trough along the inner wall surface of the female seat being formed with a pair of grooves extending along an axial direction of the female seat, each groove of the pair of grooves including two sidewalls extending radially from a proximal open end of the corresponding groove to a distal closed end of the corresponding groove, and the female seat being formed with at least one coupling portion at a portion of the inner and outer wall surfaces corresponding to the annular buckle recess;
   a joint member having one end formed with a spherical head, two opposite sides of the spherical head being provided with a pair of protrusions, wherein the pair of protrusions are integrally formed in one-piece formation with the spherical head, the spherical head of the joint member being accommodated in the accommodating trough of the female seat, the pair of protrusions being accommodated in the pair of grooves, respectively;
   at least one engaging member disposed in the at least one coupling portion of the female seat, the at least one engaging member being movable from an open end of the at least one coupling portion towards the accommodating trough for engaging the spherical head; and
   an annular buckle is fit to the annular buckle recess to be fastenerlessly retained thereat.

2. The universal socket structure as claimed in claim 1, wherein an elastic member is disposed in the accommodating trough of the female seat for pushing and supporting the spherical head to engage with the at least one engaging member.

3. The universal socket structure as claimed in claim 1, wherein the at least one coupling portion is a through hole penetrating through a portion of the inner and outer wall surfaces of the female seat corresponding in position to the annular buckle recess, wherein when the annular buckle is fitted to the annular buckle recess, the annular buckle pushes the at least one engaging member to move laterally toward the accommodating trough, thereby the at least one engaging member partially extends to the accommodating trough for holding the spherical head.

4. The universal socket structure as claimed in claim 3, wherein a portion of the outer wall surface of the female seat corresponding in position to the annular buckle recess is formed with a limit shoulder, and when the annular buckle is fitted to the annular buckle recess, the annular buckle abuts against the limit shoulder.

5. The universal socket structure as claimed in claim 4, wherein a diameter of the annular buckle is less than a diameter of a portion of the outer wall surface of the female seat between the limit shoulder and the receiving end.

6. The universal socket structure as claimed in claim 1, wherein each of the pair of grooves is a U-shaped groove and also includes a bottom surface, and the two sidewalls of each groove of the pair of grooves are connected to the corresponding bottom surface, and an angle between each of the two sidewalls and the bottom surface is greater than 90 degrees.

7. The universal socket structure as claimed in claim 1, wherein each of the pair of grooves is a U-shaped groove and also includes a bottom surface, and the two sidewalls of each groove of the pair of grooves are connected to the corresponding bottom surface, and an angle between each of the two sidewalls and the bottom surface is less than 90 degrees.

8. The universal socket structure as claimed in claim 1, wherein the pair of protrusions are cylindrical posts integrally formed in one-piece formation with the spherical head.

9. The universal socket structure as claimed in claim 1, wherein the pair of protrusions are polygonal posts integrally formed in one-piece formation with the spherical head.

10. The universal socket structure as claimed in claim 1, wherein the at least one coupling portion is a through hole penetrating through a portion of the inner and outer wall surfaces of the female seat corresponding in position to the annular buckle recess, and the at least one engaging member is a ball.

11. The universal socket structure as claimed in claim 10, wherein an outer diameter of the ball is greater than a thickness of a wall section of the through hole.

12. The universal socket structure as claimed in claim 1, wherein a width of the proximal open end of a corresponding groove of the pair of grooves is different from a width of the distal closed end of the corresponding groove thereby increasing a rotation angle of the joint member relative to the female seat.

* * * * *